United States Patent [19]

Audeh et al.

[11] 4,430,314

[45] Feb. 7, 1984

[54] METHOD OF PREPARING CRYSTALLINE ZEOLITE

[75] Inventors: Costandi A. Audeh, Princeton; William J. Reagan, Englishtown, both of N.J.

[73] Assignee: Mobil Oil Corporation, New York, N.Y.

[21] Appl. No.: 365,472

[22] Filed: Apr. 5, 1982

Related U.S. Application Data

[63] Continuation of Ser. No. 156,902, Jun. 6, 1980, abandoned.

[51] Int. Cl.$^3$ .............................................. C01B 33/20
[52] U.S. Cl. ..................................... 423/326; 423/328; 423/329; 423/332; 260/448 C; 502/77
[58] Field of Search ................................. 423/326–332; 252/431 N, 455 Z; 260/429 R, 448 C; 556/400, 407; 546/2, 8, 14

[56] References Cited

U.S. PATENT DOCUMENTS

| | | | |
|---|---|---|---|
| 3,216,789 | 11/1965 | Breck | 423/328 |
| 3,702,886 | 11/1972 | Argauer et al. | 423/328 |
| 3,941,871 | 3/1976 | Dwyer et al. | 423/326 |
| 4,000,248 | 12/1976 | Martin | 423/329 |
| 4,061,724 | 12/1977 | Grose et al. | 423/335 |
| 4,104,294 | 8/1978 | Grose et al. | 260/448 C |
| 4,285,922 | 8/1981 | Audeh et al. | 423/329 |
| 4,331,643 | 5/1983 | Rubin et al. | 252/431 N |

Primary Examiner—Helen M. McCarthy
Assistant Examiner—Jackson Leeds
Attorney, Agent, or Firm—Alexander J. McKillop; Michael G. Gilman; Charles J. Speciale

[57] ABSTRACT

A method of preparing zeolite ZSM-5 type crystals and mixtures thereof which comprises crystallizing the substantially pure zeolite material from a silica and, optionally, alumina gel mixture in the presence of organic nitrogen-N-oxides and the products produced thereby, thermally or unthermally treated.

4 Claims, 1 Drawing Figure

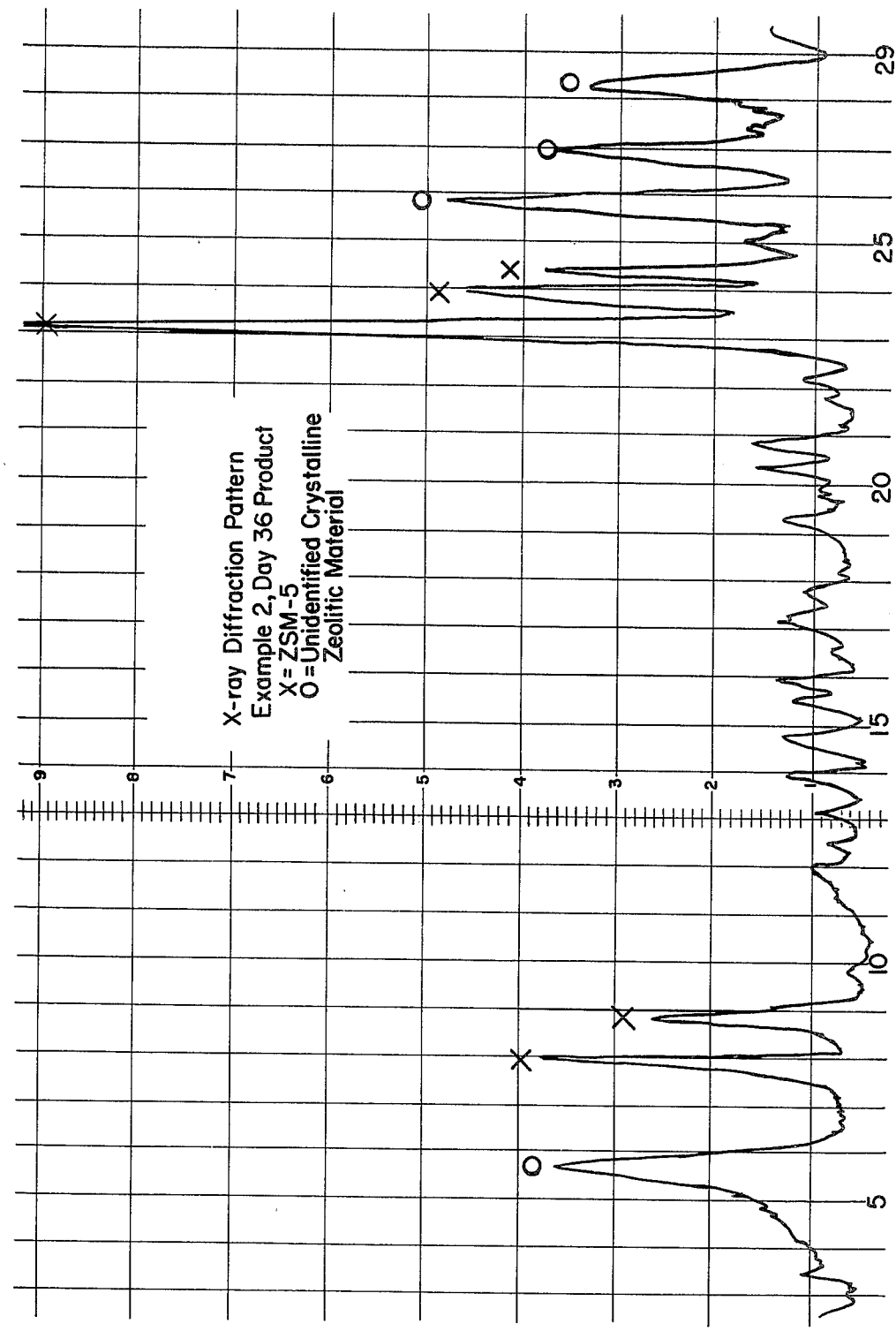

METHOD OF PREPARING CRYSTALLINE ZEOLITE

This is a continuation of application Ser. No. 156,902, filed June 6, 1980 now abandoned.

FIELD OF THE INVENTION

This invention relates to an improved method of preparing crystalline zeolite materials from organic nitrogen-N-oxides.

DESCRIPTION OF THE PRIOR ART

Zeolite materials, both natural and synthetic, have been demonstrated in the past to have catalytic properties for various types of hydrocarbon conversions. Certain zeolitic materials are ordered, porous crystalline aluminosilicates having a definite crystalline structure within which there is a large number of channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1.2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may often be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are usually occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-21 and 38 (U.S. Pat. No. 4,046,859), and zeolite ZSM-23 (U.S. Pat. No. 4,076,842), merely to name a few.

SUMMARY OF THE INVENTION

The present invention relates to an improved method of preparing synthetic crystalline zeolite materials having a constraint index between 1 and 12 and a $SiO_2/Al_2O_3$ ratio greater than 5. More particularly the present invention relates to an improved method of preparing the zeolites ZSM-5, ZSM-11, ZSM-12, ZSM-21, ZSM-23, ZSM-35, ZSM-38 and ZSM-48 described in our copending U.S. application Ser. No. 13,640 filed Feb. 21, 1979.

Still more particularly, the present invention is directed to an improved method for preparing a group of crystalline zeolite materials hereinafter designated as ZSM-5 and an unidentified crystalline material which comprises crystallizing the substantially pure zeolite material from a silica and alumina (optional) gel mixture in the presence of organic nitrogen-N-oxides, such as trialkyl-amine-N-oxides or 4-picoline-N-oxide, with the alkyl group preferably comprising $C_2$–$C_5$ hydrocarbons. For example, with a tripropyl-amine-N-oxide, a mixture of ZSM-5 and an unidentified crystalline zeolitic material was obtained while with the 4-picoline-N-oxide, only the unidentified zeolitic material was produced.

DESCRIPTION OF PREFERRED EMBODIMENTS

Zeolite ZSM-5, for example, has the formula, in terms of mole ratios of oxides as follows:

$$0.9 \pm 0.2 \; M_{2/n}O : Al_2O_3 : Y \; SiO_2 : z H_2O$$

wherein M is at least one cation having a valence n, Y is at least 5 and z is 0–40. M can be an alkali metal, e.g. sodium, and tetraalkylammonium cations, the alkyl group containing 2–5 carbon atoms.

Members of the family of zeolites designated herein as ZSM-5 have an exceptionally high degree of thermal stability thereby rendering them particularly effective for use in processes involving elevated temperatures.

Members of the family of ZSM-5 zeolites possess a definite distinguishing crystalline structure whose x-ray diffraction pattern shows the following significant lines:

TABLE 1

| Interplanar Spacing d(A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 / 5.97 ± 0.1 | W |
| 5.56 ± 0.1 | W |
| 5.01 ± .1 | W |
| 4.60 ± 0.08 | W |
| 4.25 ± 0.08 | W |
| 3.85 ± 0.07 | VS |
| 3.71 ± 0.05 | S |
| 3.04 ± 0.03 | W |
| 2.99 ± 0.02 | W |
| 2.94 ± 0.02 | W |

The unidentified crystalline zeolitic material also produced crystallizes into large irregularly-shaped particles which are agglomerates of very small platelets. The crystalline product is relatively unstable and undergoes a loss in crystallinity and a large decrease in lattice parameter on calcination. Crystallite size may have a bearing thereon.

The X-ray diffraction pattern of the unidentified crystalline material of the present invention has the following values:

TABLE 2

| Interplanar Spacing d(A) | Relative Intensity I/Io |
|---|---|
| 15.70 | 100 |
| 8.01 | 2 |
| 7.73 | 8 |
| 7.25 | 5 |
| 7.09 | 2 |
| 5.64 | 2 |
| 5.18 | 13 |
| 5.01 | 8 |
| 4.91 | 4 |
| 4.59 | 3 |
| 4.47 | 8 |
| 4.36 | 3 |
| 4.14 | 2 |
| 4.00 | 4 |
| 3.90 | 2 |
| 3.63 | 17 |
| 3.54 | 24 |
| 3.44 | 70 |
| 3.30 | 41 |
| 3.21 | 14 |
| 3.15 | 44 |
| 2.99 | 2 |
| 2.87 | 3 |
| 2.82 | 3 |
| 2.73 | 1 |
| 2.64 | 3 |
| 2.61 | 2 |
| 2.59 | 3 |
| 2.53 | 2 |
| 2.42 | 1 |
| 2.35 | 4 |
| 2.31 | 2 |
| 2.28 | 2 |
| 2.06 | 1 |
| 1.87 | 1 |
| 1.84 | 3 |
| 1.83 | 11 |

These values for ZSM-5 and the unidentified material were determined by standard techniques. The radiation was the K-alpha doublet of copper and a diffractometer equipped with a scintillation counter and a strip chart recorder was used. The peak heights, I, and the positions as a function of 2 theta, where theta is a Bragg angle, were read from the diffractometer chart. From these, the relative intensities, 100 I/I$_o$, where I$_o$ is the intensity of the strongest line or peak, and d(obs), the interplanar spacing in A, corresponding to the recorded lines, were calculated. In Table 1 the relative intensities are given in terms of the symbols VS=Very Strong, S=Strong, and W=Weak, or numerically. It should be understood that each X-ray diffraction pattern is characteristic of all the species of each zeolite structure, i.e., ZSM-5 and the unidentified product, respectively.

The sodium form of ZSM-5 as well as other cationic forms reveals substantially the same pattern with some minor shifts in interplanar spacing and variation in relative intensity. Other minor variations can occur depending on the silicon to aluminum ratio of the particular sample, as well as if it has been subjected to thermal treatment.

ZSM-5 can be used either in the alkali metal form, e.g., the sodium form, the ammonium form, the hydrogen form or another univalent or multivalent form. When used as a catalyst it will be subjected to thermal treatment to remove part or all of any organic constituent.

Zeolites ZSM-5, ZSM-11 and ZSM-12 have, for example, been originally crystallized in the presence of quaternary ammonium compounds or precursors thereof, e.g., ZSM-5, tetrapropylammonium ions, ZSM-11, tetrabutylammonium ions, and ZSM-12, tetraethylammonium (TEA) ions. We have found the organic nitrogen-N-oxides to be effective in zeolite synthesis. Depending upon the mixture composition, the product will be ZSM-5 plus the unidentified crystalline component using tripropyl-amine-N-oxide, or using a 4-picoline-N-oxide only the unidentified crystalline zeolitic component will be obtained.

The gel compositions of the two crystallization modes are identical except for the choice of the organic component indicated above. These compositions, which are listed in Table 3, are in the range of a conventional 70/1 SiO$_2$/Al$_2$O$_3$ ratio ZSM-5 preparation.

The crystalline zeolites and the unidentified crystalline zeolitic material can be prepared from a reaction mixture containing a source of silica, optionally alumina, organic nitrogen-N-oxides (R$_2$O), an alkali metal oxide (M), e.g., sodium, and water, and having a composition in terms of mole ratios of oxides, falling within the following ratios:

| REACTANTS | BROAD | PREFERRED |
|---|---|---|
| SiO$_2$/Al$_2$O$_3$ | 10 to ∞ | 50 to 90 |
| M$_2$O/SiO$_2$ | 0.01 to 3.0 | 0.1 to 1.0 |
| R$_2$O/M$_2$O | 0.01 to 2.0 | 0.1 to 1.0 |
| OH$^-$/SiO$_2$ | 0 to 1.0 | 0.1 to 0.5 |

Since a source of alumina in the reaction mixture is optional, when this embodiment of the invention is practiced, substantially no alumina will be present in the synthetic crystalline zeolite product obtained therefrom.

The zeolites formed by the present invention form a class characterized in their preparation by reaction mixtures of lower alkalinity and by a zeolite product of SiO$_2$/Al$_2$O$_3$>5. In addition they have a constraint index of between 1 and 12.

The constraint index is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Catalysts suitable for the present invention are those having a constraint index in the approximate range of 1 to 12. Constraint Index (CI) values for some typical catalysts are:

| CAS | C.I. |
|---|---|
| ZSM-5 | 8.3 |
| ZSM-11 | 8.7 |
| ZSM-12 | 2 |
| ZSM-38 | 2 |
| ZSM-35 | 4.5 |
| TMA Offretite | 3.7 |

Crystallization can be carried out at either static or stirred conditions. In our examples static conditions were employed using polypropylene jars at 100° C. or stainless steel autoclaves at 160° C. The total useful range of temperatures is 80° C. to 180° C. for about 6 hours to 150 days. Thereafter, the zeolite crystals are separated from the liquid and recovered. The composition can be prepared utilizing materials which supply the appropriate oxides. Reaction mixtures can include sodium silicate, silica hydrosol, silica gel, silicic acid, and sodium hydroxide, and of course, the organic nitrogen-N-oxides heretofore described. The reaction mixture can be prepared either batch-wise or continuously. Crystal size and crystallization time of the zeolite compositions will vary with the nature of the reaction mixture employed and the crystallization conditions.

As indicated above, the zeolite crystals prepared by the instant invention are shaped in a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the catalyst crystals can be extruded before drying or dried or partially dried and then extruded.

The zeolites prepared can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such component can be impregnated in or on to it such as, for example, by, in the case of platinum, treating the zeolite with a solution containing a platinum metal-containing ion. Thus, suitable platinum compounds include chloroplatinic acid, platinous chloride and various compounds containing the tetrammine-platinum complex.

The above zeolite crystals especially in their metal, hydrogen, and ammonium forms can be beneficially converted to a catalytically applicable form by thermal treatment. This thermal treatment is generally performed by heating one of these forms in an atmosphere such as air, nitrogen, steam, etc., at a temperature of at least 700° F. for at least 1 minute and generally not more than 20 hours to remove part or all of the water and the organic constituent. While subatmospheric pressure can be employed for the thermal treatment, atmospheric pressure is desired for reasons of convenience. The thermal treatment can be performed at a temperature up to about 1700° F. The thermally treated product is particularly useful in the catalysis of certain hydrocarbon conversion reactions.

In the case of many catalysts it is desired to incorporate the zeolite with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the zeolite material, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally-occurring clays, e.g. bentonite and kaolin, to improve the crush strength of the catalyst under commercial operating conditions. Said material, i.e. clays, oxides, etc., function as binders for the catalyst. It is required to provide a catalyst having good crush strength because in commercial use it is desirable to prevent the catalyst from breaking down into powder-like materials. These clay binders also improve the crush strength of the catalyst.

Naturally-occurring clays which can be composited with the zeolite crystals include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the catalyst also include inorganic oxides, notably alumina.

In addition to the foregoing materials, the zeolite catalysts can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided catalyst and inorganic oxide gel matrix vary widely with the zeolite content ranging from about 1 to about 90 percent by weight and more usually, particularly when the composite is prepared in the form of beads, in the range of about 2 to about 50 percent by weight of the composite.

In order to more fully illustrate the nature of the invention and the manner of practicing same, the following examples are presented, wherein ZSM-5, the unidentified crystalline material, and mixtures of both were obtained.

In the examples which follow whenever adsorption data are set forth for comparison of sorptive capacities for water, cyclohexane and n-hexane, they were determined as follows:

A weighed sample of the calcined adsorbent was contacted with the desired pure adsorbate vapor in an adsorption chamber, evacuated to <1 mm and contacted with 12 mm Hg water vapor or 20 mm Hg of cyclohexane or n-hexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period which did not exceed about eight hours. As adsorbate was adsorbed by the silico-crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbent.

EXAMPLES 1 AND 2

The following examples, compiled as Tables 3 and 4 immediately hereinbelow, give details as to formulation and reaction conditions. Analytical data on the crystallization products obtained is given in Table 5.

TABLE 3

| GEL COMPOSITIONS OF REACTION MIXTURES | | |
|---|---|---|
| $SiO_2/Al_2O_3$ | = | 94.1 |
| $H_2O/OH^-$ | = | 273 |
| $(M_2O + R_2O)/SiO_2$ | = | .995 |
| $M_2O/SiO_2$ | = | .96 |

TABLE 3-continued

GEL COMPOSITIONS OF REACTION MIXTURES

| | | |
|---|---|---|
| $R_2O/M_2O$ | = | .053 |
| $OH^-/SiO_2$ | | .15 |

For Example 1: R = 4-picoline-N—oxide

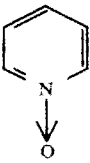

For Example 2: R = tripropyl-amine-N—oxide $(C_3H_7)_3N \rightarrow O$

TABLE 4

TIME SEQUENCE OF CRYSTALLIZATIONS

EXAMPLE 1 (4-picoline-N—oxide)

| Crystallization Time (days) | Results[1] |
|---|---|
| 17 | Unidentified crystalline zeolitic material. |
| 21–25 | Maximum intensity of lines with no change. |
| 26 | Addition of TPA Br |
| 31 | ZSM-5 identified + other product as above. |
| 41 | 92% ZSM-5 + other product as above. |
| 46 | End reaction. |

EXAMPLE 2 (tripropyl-amine-N—oxide)

| Crystallization Time (days) | Results |
|---|---|
| 12 | ZSM-5, unidentified crystalline zeolitic material. |
| 36 | 50% ZSM-5 + unidentified crystalline zeolitic material. |
| 83 | 61% ZSM-5 + unidentified crystalline zeolitic material. |
| 89 | End reaction. |

[1]ZSM-5 crystallinity measured by peak height of 23.220 peak; no quantitative measure of the other product was possible for lack of a standard.

TABLE 5

ANALYTICAL DATA ON CRYSTALLIZATION PRODUCTS

| Product of Example 1 | 46 days at 100° C. | Major product = ZSM-5 |
|---|---|---|
| $SiO_2$ | 95.7 | (4-picoline-N—oxide, then tetrapropyl ammonium) |
| $Al_2O_3$ | 2.17 | |
| Na | 1.15 | |
| C | 9.6 | $\frac{C}{N} = 12.47$ |
| N | 0.9 | |
| ash | 86.6 | $(C_3H_7)_4N = \frac{12}{1} = \frac{C}{N}$ |
| $SiO_2/Al_2O_3 =$ | 74.8 | |
| Na/Al = | 1.17 | |
| Product of Example 2 | 89 days at 100° C. | mixture of ZSM-5 + unidentified crystalline zeolite material (tripropyl-amine-N—oxide) |
| $SiO_2$ | 91.6 | |
| $Al_2O_3$ | 2.2 | |
| Na | 2.4 | |
| C | 3.6 | C/N = 8.00 |
| N | 0.52 | |
| ash | 88.5 | $(C_3H_7)_3N \rightarrow O$ 9/1 $\frac{C}{N}$ |
| $SiO_2/Al_2O_3 =$ | 70.6 | |
| Na/Al = | 2.4 | |

The time sequences for the two crystallization experiments are presented in the foregoing Table 4. As noted in the Table, no standard sample was available for a quantitative measure of the crystallinity of the unidentified crystalline component. The maximum intensity of these lines was observed at 21–25 days of Example 1. This suggests that the presence of 4-picoline-N-oxide accelerates the crystallization rate of this product.

This crystallization experiment (Example 1), was continued by addition of tetrapropylammonium bromide and ZSM-5 was the major crystalline product at the termination of the experiment. The other experiment, (Example 2) with only tripropyl-amine-N-oxide present, yielded an initial mixture of ZSM-5 and the other product. Further crystallization appeared to favor the ZSM-5 component but changes were not rapid so the run was terminated after only a 10% increase in ZSM-5 crystallinity was noted after 50 days. The attached FIGURE illustrates a typical diffraction pattern of the solid product of this crystallization produced by the manner of Example 2.

The chemical analyses of the two crystalline products are listed in Table 5. Both products have high silica to alumina ratios as expected from the starting gel compositions. The product of Example 1, where 4-picoline-N-oxide was supplemented by tetrapropylammonium bromide, has a high C/N ratio close to that expected for tetrapropylammonium ions. The other product, from Example 2, has a C/N ratio close to that of the initial tripropyl-amine-N-oxide organic component. The high concentration of sodium (Na/Al=2.4) suggests that the N-oxide compound may not have an ionic charge. However, the N-O bond may be polarized enough to present a partially charged template for crystallization of both ZSM-5 and the other product.

The unidentified zeolitic material which is a component of both crystallization products is known to be thermally unstable. However, surprisingly, this material can serve as a silica-alumina binder for the ZSM-5 component, as Example 3 will show.

EXAMPLE 3

The product of Example 2 was calcined at 300° C. and 600° C. respectively. Results are compiled in Table 6.

TABLE 6

| Product of Example | Material | Treatment | Weight Percent Sorbed | |
|---|---|---|---|---|
| | | | n-hexane | cyclohexane |
| 2 | ZSM-5 + unidentified crystalline material | 300° C. | 2.6 | 1.6 |
| 2 | ZSM-5 | 600° C. | 5.9 | 1.0 |

Note that when the unidentified component of the product of Example 2 is collapsed by calcination at 600° C., the n-hexane sorption more than doubles (5.9 vs. 2.6) suggesting higher catalytic activity and leaving the collapsed crystalline product to serve as a binder for the ZSM-5 catalyst component.

What is claimed is:

1. A method for preparing a synthetic crystalline zeolite material consisting essentially of ZSM-5 and an unidentified crystalline material having the X-ray diffraction pattern of Table II and having a constraint index between 1 and 12 and a $SiO_2/Al_2O_3$ ratio greater than 5 which comprises preparing a reaction mixture containing a source of an alkali metal oxide, an oxide of silicon, optionally an oxide of aluminum, $R_2O$, and water, and having a composition, in terms of mole ratios of oxides, falling within the following ranges:

$SiO_2/Al_2O_3 = 10$ to $\infty$
$M_2O/SiO_2 = 0.01$ to $3.0$
$R_2O/M_2O = 0.01$ to $2.0$
$OH/SiO_2 = 0$ to $1.0$ wherein M is an alkali or alkaline earth metal and $R_2O$ is an organic nitrogen-N-oxide selected from the group consisting of 4-picoline-N-oxide and a trialkyl-amine-N-oxide wherein the alkyl group comprises $C_2$–$C_5$ hydrocarbons and maintaining said mixture under crystallization conditions until crystals of said zeolite material are formed.

2. A method according to claim 1 wherein said trialkyl-amine-N-oxide is tripropyl-amine-N-oxide.

3. A method of preparing in situ a catalyst composition consisting essentially of a ZSM-5 zeolite in an inorganic oxide binder which comprises:

(a) preparing a reaction mixture containing a source of an alkali metal oxide, an oxide of silicon, optionally an oxide of aluminum, $R_2O$, and water, and having a composition, in terms of mole ratios of oxides, falling within the following ranges:

$SiO_2/Al_2O_3 = 10$ to $\infty$
$M_2O/SiO_2 = 0.01$ to $3.0$
$R_2O/M_2O = 0.01$ to $2.0$
$OH/SiO_2 = 0$ to $1.0$ wherein M is an alkali or alkaline earth metal and $R_2O$ is an organic nitrogen-n-oxide selected from the group consisting of 4-picoline-N-oxide and a trialkyl-amine-N-oxide wherein the alkyl group comprises $C_2$–$C_5$ hydrocarbons, (b) maintaining said mixture under crystallization conditions until crystals consisting essentially of ZSM-5 and an unidentified crystalline material having the X-ray diffraction pattern of Table II are formed, and (c) subjecting said crystals to thermal treatment effective to cause the unidentified crystalline material to collapse forming an inorganic oxide binder for the ZSM-5.

4. A method according to claim 3 wherein said trialkyl-amine-N-oxide is tripropyl-amine-N-oxide.

* * * * *